United States Patent Office 3,462,289
Patented Aug. 19, 1969

3,462,289
PROCESS FOR PRODUCING REINFORCED
CARBON AND GRAPHITE BODIES
Cornelius W. Rohl, Lewiston, N.Y., and James H. Robinson, Canoga Park, Calif., assignors, by mesne assignments, to The Carborundum Company, a corporation of Delaware
No Drawing. Filed Aug. 5, 1965, Ser. No. 478,033
Int. Cl. C23c 9/06, 13/00; B44d 1/46
U.S. Cl. 117—46                          15 Claims

ABSTRACT OF THE DISCLOSURE

Carbon or graphite reinforced articles are produced by (1) forming reinforcing fibers into a shape, without any binder; (2) holding the shaped fibers under a vacuum; (3) pressure impregnating the fibers with carbonizable binder; (4) compressing the fibers to remove excess binder; (5) curing and (6) carbonizing the remaining binder; and (7) repeating at least once the vacuum, impregnation, curing and baking operations. The articles are substantially free of internal cracks and voids, therefore of high strength, even at relatively low densities. As such, the articles are particularly useful in the aerospace industry, where strong, lightweight materials are required.

---

This invention relates to a method for making carbon and graphite articles, more particularly this invention relates to a process for making carbon or graphite articles by bonding fibers of carbon or graphite.

Carbon and graphite articles have found many applications in modern industry, particularly in the aerospace field, where resistance to corrosion, high temperature, thermal shock, and good electrical and wear characteristics are required of the material to be used. In this connection it has been found that the existing methods of producing carbon and graphite bodies are deficient in certain aspects. For example, bodies formed by the extrusion or molding of coke and a binder are often too heavy for many applications and if formed so as to be light enough, such bodies lack the strength to be used without additional supporting materials. For many applications including use in rockets and missiles weight is extremely critical and it is essential that materials used in such applications be lightweight and yet have sufficient strength to be formed into self-supporting articles without the necessity of using reinforcing materials which add to the weight of the article so formed.

In attempting to overcome the weight and strength deficiencies of the molded or extruded carbon and graphite bodies, articles consisting essentially of plastic with reinforcing fibers of carbon or graphite were used. Articles formed in this manner, however, do not possess the characteristics of pure carbon or graphite articles and consequently are not adequate for many applications to which carbon and graphite articles are applied. Attempts to produce articles by bonding graphite cloth with carbon have met with some success but the articles are limited in application due to restrictions in the process for forming such articles which will be hereinafter pointed out.

The usual method of producing articles of this type is to coat sheets of graphite cloth with a suitable binder, stack the sheets and heat the stacked sheets to carbonize the binder. When applying the coating of binder to the graphite cloth sheet it is extremely difficult, if not impossible, to avoid variations in the thickness of the binder layer on the sheet. Consequently as the sheets are stacked there will be a variation of the binder thickness between the graphite cloth sheets. As the stacks of graphite cloth sheets are heated in order to first cure and then carbonize the binder, the binder will expand within the stacks at an uneven rate due to the variation of the binder thickness. At the carbonizing temperature the binder, as it is converted into carbon, contracts and this contraction will also occur at a non-uniform rate due to the variation in thickness of the original binder layer. The resulting body has set up within it internal stresses due to the uneven rate of expansion and contraction of the binder which eventually will lead to cracks within the body when subjected to normal operating conditions. Accordingly, when forming laminated carbon or graphite articles by this process it is necessary to restrict the thickness of the article in order to hold the uneven expansion and contraction of the binder caused by variations in binder thickness to a minimum and furthermore it is necessary to limit the article produced to only the simplest of shapes.

It is an object of this invention to produce a high-strength reinforced carbon or graphite article substantially free of internal cracks and voids.

A further object of this invention is to produce a reinforced carbon or graphite article wherein the binder is uniformly applied.

Further objects and advantages of the invention will be apparent from a consideration of the following description of the embodiments described below and the novel features thereof will be particularly pointed out hereinafter in connection with the appended claims.

We have found that high-strength carbon or graphite articles can be produced by forming carbon or graphite fibers into a shape and pressure impregnating a suitable binder into the shape. After impregnating the binder the shape is compressed to squeeze out excess binder and the compressed impregnated shape is fired to carbonize the binder. Bodies produced according to this process are substantially free of internal stress because the binder is uniformly applied throughout the entire article. The carbon or graphite fibers may be formed into yarn, tape, cloth, felt, chopped fiber, or wool. The fibers can be built up in flat layers, wrapped around mandrels, or in the case of wool and chopped fibers, be randomly disposed or directionally oriented in molds. Articles produced according to this process may be used as molds for hot pressing, boats in high temperature metallurgical operations, rocket nozzles, containers for highly corrosive materials, or in any application where the chemical, electrical, high temperature and wear characteristics of carbon or graphite are desired.

The carbon fiber used in this invention is derived from the carbonization of carbonizable fibrous material such as cellulosic fibers. The carbonized fibrous material may be graphitized to form graphite reinforcing material. The fiber may be used as woven cloth sheets, strip, yarn or as individual fibers. In addition the carbon fibers may be used as wool wherein the fibers are randomly disposed.

The carbon or graphite fibers may be formed into a shape by stacking layers of woven fibers or by wrapping the fibers in the form of filaments, yarns, tapes or woven or felted fabrics around a mandrel.

Any suitable impregnant which will carbonize when heated at elevated temperatures may be utilized in the present process. For example binders such as phenolic condensation products, urea condensation products, epoxy resins, dextrose and coal tar pitch may be used. However, it is preferred to use a polymer of liquid furfuryl alcohol as the impregnant binder.

In practice the reinforced carbon or graphite shapes are made by forming a shape from layers of carbon or graphite reinforcing fibers in the form of cloth, felt or wool, or by wrapping carbon or graphite tape or yarn around a mandrel of suitable form. In the forming of the shape the carbon or graphite fiber is used in "dry" condition, that is without the application of a binder coating. Means are provided to clamp or hold the dry carbon or graphite fibers in the desired shape and the assembly is held under vacuum for a suitable period of time. The assembly is then pressure impregnated with a suitable carbonaceous resin. The resin impregnated shape is then placed under compression to remove excess impregnated resin and the article is pressure cured for eight hours. After curing the article is baked, using a protective atmosphere of nitrogen, at atmospheric pressure. During the baking operation the temperature of the body is gradually raised from the curing temperature to 800° C. The rate of temperature increase is largely a function of the size of the article to be cured. Large articles must be cured at a slower rate of temperature increase than small articles in order that the temperature be uniform throughout the article thus avoiding harmful internal stresses that are caused by uneven heating of the article.

At the completion of the above impregnating and baking steps the shape may be again placed under vacuum and reimpregnated and baked. The number of impregnation and baking cycles is determined by the density that is desired in the finished shape.

Although it is within the scope of this invention to produce reinforced carbon or graphite articles of lower density, i.e., under 1.4, it is preferred that the reinforced articles be reimpregnated and recured in order to obtain high density and high strength. We have found that generally six impregnation and baking cycles will produce a density of at least 1.4 gms./cc.

Reinforced carbon or graphite articles produced according to this invention are very stable at high temperatures and are highly resistant to thermal shock. In addition, like extruded or molded graphite articles, reinforced graphite articles increase in strength as the temperature is increased.

It is within the scope of this invention ot produce bodies of non-uniform density in order to take advantage of differences in thermal conductivity. For example, an article can be produced by this process wherein the interior portion of the article is of high density and high strength while at the same time the exterior portion of the article is of low density so that it is a good insulating material. Such articles are extremely useful in rocket and missile applications.

The following specific examples illustrate more clearly the exact manner in which the process of the present invention can be carried out, although the invention is not to be construed as being limited to the particular articles set forth in the examples.

EXAMPLE I

A carbon article was produced according to this process by dry stacking 600 5″ squares of carbon cloth, the cloth having a ½″ hole in the center, on a graphite mandrel. Each carbon cloth square was rotated 45° with respect to the square underneath it, so that the cloth fibers produced a rosette pattern. The dry stacked cloth squares of carbon were lightly clamped to hold the sheets in place and the clamped sheets were placed in an autoclave and evacuated to a pressure of at least 29″ of mercury. The carbon cloth squares were then pressure impregnated with liquid furfuryl alcohol polymer catalyzed with 5 percent maleic anhydride, at a pressure of 120 pounds per square inch for 1½ hours. The resin impregnated shape was compressed to the desired thickness and the excess resin was squeezed out of the shape. The resin impregnated shape was maintained under compression and was cured in an autoclave at a pressure of 90 to 120 p.s.i. at 125° C. for 8 hours. After curing, the shape was baked in a protective atmosphere of nitrogen, by raising the temperature to 800° C. During the baking cycle care was exercised in raising the temperature of the article so that the temperature was raised at a rate of 5° C. per hour until the article was at 450° C., then the rate of temperature increase was raised to 20° C. per hour until the article was at 800° C. At the completion of the baking cycle the article was cooled and the impregnating and baking cycles were repeated six times, using an impregnant consisting of equal parts of a liquid furfuryl alcohol polymer and furfural catalyzed with 3 percent by weight of maleic anhydride. At the completion of the third baking cycle the temperature of the article was raised to 1500° C. The higher baking temperature, by reducing the volatiles remaining in the carbon bond, strengthens the bond and improves the ability of the article to absorb more resin during subsequent impregnation cycles.

The number of sheets of carbon cloth used in the shape was determined by the final desired thickness of the article and the amount of resin which is to be left in the article. It has been found that maximum strength of the finished article is obtained when the fiber density of the article is between .80 and .95 gms./cc.

It has been found that when fiber density is less than .80 gms./cc. the bodies spall and crack and when fiber density is over .95 gms./cc. there is insufficient binder and the articles lack strength.

At the end of the first impregnating and baking cycle the shape was machined into a cylindrical form and then subjected to the additional impregnation and baking cycles described above. After completion of four impregnation and baking cycles the shape had a density of 1.33 and after six impregnation densities of 1.4 were produced. The articles produced had physical values as listed below.

Table I

Apparent density 1.4 gms./cc.
Flexural strength with laminations parallel to long axis
    Load perpendicular to laminations 7,300 p.s.i.
    Load parallel to laminations 14,000 p.s.i.
Compressive strength:
    With laminations 8,300 p.s.i.
    Against laminations 45,000 p.s.i.
Coefficient of thermal expansion (inch/inch/° C.):
    With laminations $14.6 \times 10^{-7}$
    Against laminations $16.3 \times 10^{-7}$
Young's modulus of elasticity:
    With laminations $16.7 \times 10^{-5}$ p.s.i.
    Against laminations $15.0 \times 10^{-5}$ p.s.i.
Electrical resistivity:
    With laminations 0.0025 ohm/in.
    Against laminations .055 ohm/in.

EXAMPLE II

A graphite article was produced in the following manner. The article as produced in Example I was placed in a graphitizing furnace and was gradually heated to a temperature of between 2500° C. and 2800° C. The resulting product was a graphite article comprising graphite reinforcing fibers bonded by graphite. The article had properties as shown in Table II.

Table II

Apparent density 1.45 gms./cc.
Flexural strength with laminations parallel to long axis
Load perpendicular to laminations 10,800 p.s.i.
Compressive strength:
    With laminations 7,600 p.s.i.
    Against laminations 23,500 p.s.i.
Coefficient of thermal expansion (inch/inch/° C.):
    With laminations $9.5 \times 10^{-7}$
    Against laminations $33.7 \times 10^{-7}$
Young's modulus of elasticity—with laminations $23.5 \times 10^5$
Electrical resistivity:
    With laminations .0017 ohm/in.
    Against laminations .00064 ohm/in.

EXAMPLE III

A 7″ x 7″ x 5″ reinforced article consisting of reinforcing fibers of graphite bonded by carbon was made in the following manner. A sufficient number of sheets of graphite cloth 7" square were stacked in a manner similar to Example I, so that the finished article would have a fiber density between .80 and .95 gms./cc. The graphite cloth sheets were lightly clamped and evacuated to a pressure of at least 29" of mercury for 1½ hours. The graphite cloth sheets were then pressure impregnated with a resin consisting of liquid furfuryl alcohol polymer and catalyzed with 5 percent by weight of maleic anhydride. The impregnating was carried out at a pressure of 120 pounds per square inch for 1½ hours. The impregnated shape was compressed to 5 inches and the excess resin was squeezed out of the shape. The shape was cured and baked as in Example I and was subjected to reimpregnating and baking cycles as in Example I. The finished article has physical values as listed in Table III after six impregnations.

Table III

Apparent density 1.45 gms./cc.
Flexural strength with laminations parallel to long axis
Load perpendicular to laminations 16,900 p.s.i.
Compressive strength:
  With laminations 10,100 p.s.i.
  Against laminations 43,400 p.s.i.
Coefficient of thermal expansion (inch/inch/° C.):
  With laminations $10.1 \times 10^{-7}$
  Against laminations $26.7 \times 10^{-7}$
Electrical resistivity:
  With laminations .0019 ohms/in.
  Against laminations .0039 ohms/in.

EXAMPLE IV

A rod was produced from carbon yarn in the following manner. Six hundred strands of two end carbon yarn were compressed into a rod and the rod was evacuated in an autoclave as in Example I. The assembly was then pressure impregnated, as in Example I, with a resin consisting of one part liquid furfuryl alcohol polymer and one part furfural. The resin was catalyzed by 3 percent by weight of the resin of maleic anhydride. The impregnated shape was cured and baked as in Example I. The resulting carbon rod may be treated as in Example II, to form a graphite rod.

EXAMPLE V

A cylindrical shape was produced in the following manner. Thirty end, 600 denier carbon yarn was dry wound on a graphite mandrel, producing a shape approximately 3 inches in diameter. During the winding operation the carbon yarn was constantly kept under tension and the end of the yarn was clamped so as to maintain the tension on the yarn and prevent it from unwinding. The shape and mandrel were then placed in an autoclave and the autoclave was evacuated to a pressure of at least 29" of mercury. The assembly was then impregnated with coal tar pitch at 125 p.s.i. for 16 hours. Curing and baking cycles were carried out as in Example I.

EXAMPLE VI

An article was made as in Example I except that 2 inch carbon cloth tape was dry wrapped around a graphite mandrel 2¾" in diameter so that the thickness of the wrapping was 1 inch. A tension of 50 pounds was maintained on the carbon tape while it was wound on the mandrel. The end of the tape was split and anchored to two pins projecting from the winding shaft on which the mandrel was mounted. The dry wrapped shape and mandrel assembly was placed in an autoclave and evacuated to a pressure at least 29" of mercury. The assembly was then pressure impregnated with furfural-furfuryl alcohol polymer resin for 16 hours and cured at a pressure of 90 to 120 p.s.i. at a temperature of 125° C. for 8 hours. The article was baked in a protective atmosphere of nitrogen as in Example I and the finished article had essentially the same characteristics as the article produced from flat layers of carbon cloth.

We have found that articles made according to this invention have a uniform structure and are essentially free from internal stress, even in the larger articles produced by this method. Thus articles made according to this invention have a high resistance to thermal shock and consequently high resistance to cracking and spalling.

Further, reinforced carbon or graphite articles made according to this invention are substantially denser and stronger than articles produced by other methods. This appears to be due to the fact that articles produced by our method can be reimpregnated and recured numerous times thus allowing the density and strength of said articles to be increased without bursting or cracking or otherwise weakening the article structure. In this connection, we have found that during one of the subsequent recuring steps, the strength of the finished article is greatly increased by raising the temperature of the article to 1500° C. Although it is preferred to do this after the third reimpregnation and recuring cycle, it may be done anytime after the first and before the last impregnation and curing cycle. The number of impregnation and curing cycles is largely determined by the shape and size and desired density and strength of the article being produced. Although the articles produced in the examples generally required six impregnations to reach a density of 1.4 gms./cc. it should be pointed out that very small articles may have a high density after less than six impregnations. On the other hand if densities greater than 1.4 are desired it is likely that more than six impregnation and curing cycles will be required.

The temperatures, pressure and time used in impregnating and curing articles produced according to this invention are variable depending on the size and shape of the article as well as the desired density of the article. Thus, small articles of relatively simple shape can be impregnated at lower pressure and cured at higher temperatures for shorter periods of time than large, relatively complex shapes. It also follows, of course, that higher temperatures and pressures will reduce the time necessary to impregnate and cure articles produced according to this invention.

Articles can be produced having graphite reinforcing fibers and a carbon bond or articles can be produced comprising carbon reinforcing fibers and carbon bond or graphite reinforcing fibers and graphite bond.

We claim:
1. A process for producing carbon or graphite reinforced articles which comprises:
   (1) forming reinforcing fibers selected from the group consisting of carbon fibers and graphite fibers into a shape, the fibers being without any binder coating, and the forming being carried out in the absence of binder;
   (2) holding the shape of fibers under vacuum;
   (3) pressure impregnating the shape of fibers with a carbonizable binder;
   (4) placing the impregnated shape of fibers under compression to remove excess binder;
   (5) placing the impregnated shape of fibers under pressure and temperature to cure the binder therein;
   (6) baking the impregnated shape in a protective atmosphere to carbonize the cured binder therein; and
   (7) subjecting the baked impregnated shape to at least one additional vacuum, impregnation, curing and baking cycle, each cycle comprising (a) holding the baked impregnated shape of fibers under a vacuum, (b) pressure reimpregnating the baked impregnated shape of fibers with a carbonizable binder; (c) placing the reimpregnated shape of fibers under pressure and temperature to cure the binder therein; and (d) baking the reimpregnated shape in a protective atmosphere to carbonize the cured binder therein.

2. A process as defined in claim 1 wherein said shape of fibers is held under a vacuum of at least 29" of mercury, prior to pressure impregnating the shape of fibers with a carbonizable binder.

3. A process as defined in claim 1 wherein the temperture of said articles is raised to about 1500° C., after the impregnated shape is first baked in a protective atmosphere, but prior to the last vacuum, impregnation, curing and baking cycle.

4. A process as defined in claim 1 wherein said shape is pressure impregnated with a carbonizable binder selected from a group consisting of coal tar pitch, a liquid furfuryl alcohol polymer, and a mix consisting of equal parts of furfural and a furfuryl alcohol polymer.

5. A process as defined in claim 1 wherein said binder is cured at a temperature of 125° C. at a pressure of at least about 90 p.s.i.

6. A process as defined in claim 1 wherein said cured impregnated shape is baked in a protective atmosphere to carbonize said binder by raising the temperature of said shape gradually to 800° C.

7. A process as defined in claim 1 wherein said carbon or graphite reinforced article is thereafter heated to a temperature of between about 2500° C. and about 2800° C. to graphitize said article.

8. A process for producing reinforced carbon articles which comprises (1) stacking sheets of carbon cloth in the absence of binder, (2) holding said stacking carbon sheets under a vacuum of at least 29" of mercury, 3 impregnating said sheets with a liquid furfuryl alcohol polymer catalyzed with 5 percent maleic anhydride at a pressure of at least 120 pounds per square inch for a period of 1½ hours, (4) compressing said impregnated sheets to a predetermined thickness so that excess impregnant is removed thereby and a fiber density of between 0.08 and 0.95 gm./cc. is achieved, (5) curing said impregnated article at a pressure of 90 to 120 p.s.i. at a temperature of 125° C., (6) baking said article in a protective atmosphere of nitrogen to carbonize the impregnant therein by raising the temperature of said article at a rate of 5° C. per hour until said article is at a temperature of 450° C., then increasing the heating rate to 20° C. per hour until said article is at a temperature of 800° C., cooling said article and (7) repeating at least once said vacuum, impregnating, curing and baking operations using an impregnant consisting of equal parts of a liquid furfuryl alcohol polymer and furfural catalyzed with 3 percent by weight of maleic anhydride.

9. A process as defined in claim 8 wherein at the completion of a vacuum, impregnating, curing and baking cycle, but prior to the last such cycle, the temperature of said article is raised to about 1500° C.

10. The process as defined in claim 9 wherein said reinforced carbon article is heated to a temperature of between 2500° C. to about 2800° C. to graphitize said article.

11. A process for producing reinforced carbon articles comprising the steps of (1) assembling a plurality of carbond fibers in the absence of binder, (2) holding said fibers under a vacuum of at least 29" of mercury, (3) impregnating said fibers with a resin consisting of equal parts of liquid furfuryl alcohol polymer and furfural, catalyzed with 3 percent by weight of the resin of maleic anhydride, said impregnation being carried out under pressure, (4) compressing the impregnated assembled fibers to remove excess resin, (5) curing the resin remaining in said impregnated fibers at a pressure of at least 90 p.s.i., (6) carbonizing said resin in said fibers by providing a protective atmosphere and gradually increasing the temperature to 800° C., and (7) repeating at least once the steps of (a) holding under vacuum, (b) impregnating with resin under pressure, (c) curing under pressure, and (d) carbonizing.

12. A process as defined in claim 11 wherein said carbon articles are heated to a temperature of between 2500° C. to about 2800° C. to graphitize said articles.

13. A method for producing a carbon article which comprises (1) winding carbon yarn, in the absence of a binder, on a graphite mandrel, maintaining tension on the yarn while winding, clamping said yarn ends so as to maintain tension on said yarn after winding, (2) holding said windings under a vacuum of at least 29" of mercury, (3) impregnating said carbon fiber windings with coal tar pitch, said impregnation being carried out at 125 p.s.i. for 16 hours, (4) compressing the impregnated windings to remove excess pitch, (5) curing said pitch at a temperature of 125° C. at a pressure of 90 to 120 p.s.i. for a period of 8 hours so as to form a cylindrical shape, removing said cylindrical shape from said mandrel, (6) carbonizing said pitch in said cylindrical shape by gradually heating said shape to 800° C. which in a protective atmosphere, and (7) repeating at least once the vacuum, impregnating, curing and baking operations.

14. A method as defined in claim 13 wherein said carbon shape is subjected to a multiplicity of impregnating, curing and carbonizing operations.

15. A method as in claim 13 wherein said carbon article is heated to a temperature of from 2500° C. to about 2800° C. to graphitize said article.

References Cited

UNITED STATES PATENTS

| 2,911,319 | 11/1959 | Peter | 117—46 |
| 3,167,447 | 1/1965 | Tully et al. | |
| 3,174,895 | 3/1965 | Gibson et al. | |
| 3,203,849 | 8/1965 | Katz et al. | 161—92 X |
| 3,233,014 | 2/1966 | Bickerdike et al. | |
| 3,238,054 | 3/1966 | Bickerdike et al. | |
| 3,316,337 | 4/1967 | North. | |

DAVID KLEIN, Primary Examiner

U.S. Cl. X.R.

264—29